(12) United States Patent
Wang et al.

(10) Patent No.: US 11,922,561 B2
(45) Date of Patent: Mar. 5, 2024

(54) METHODS AND SYSTEMS FOR IMPLEMENTING SCENE DESCRIPTIONS USING DERIVED VISUAL TRACKS

(71) Applicant: MEDIATEK Singapore Pte. Ltd., Singapore (SG)

(72) Inventors: Xin Wang, San Jose, CA (US); Lulin Chen, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/494,162

(22) Filed: Oct. 5, 2021

(65) Prior Publication Data

US 2022/0108519 A1    Apr. 7, 2022

Related U.S. Application Data

(60) Provisional application No. 63/087,943, filed on Oct. 6, 2020.

(51) Int. Cl.
*G06T 15/20* (2011.01)
*G06T 3/00* (2006.01)

(52) U.S. Cl.
CPC .......... *G06T 15/20* (2013.01); *G06T 3/0062* (2013.01)

(58) Field of Classification Search
None
See application file for complete search history.

(56) References Cited

U.S. PATENT DOCUMENTS

2013/0188922 A1*  7/2013  Furbeck ............... H04N 5/772
                                              386/E9.011
2018/0109817 A1*  4/2018  Wang ............... H04N 21/85406
(Continued)

FOREIGN PATENT DOCUMENTS

CN    108605093 A    9/2018
CN    111338463 A    6/2020

OTHER PUBLICATIONS

Curcio et al., 'Multi-Viewpoint and Overlays in the MPEG OMAF Standard', ITU Journal: ICT Discoveries, vol. 3(1), May 18, 2020.*
(Continued)

*Primary Examiner* — Patrick F Valdez
(74) *Attorney, Agent, or Firm* — Wolf, Greenfield & Sacks, P.C.

(57) ABSTRACT

The techniques described herein relate to methods, apparatus, and computer readable media configured to generate media data for an immersive media experience. A set of parameters for processing a scene description for an immersive media experience are accessed. Multimedia data for the immersive media experience is accessed, including a plurality of media tracks, each media track comprising an associated series of samples of media data for a different component of the immersive media experience, and a derived track comprising a set of derivation operations to perform to generate a series of samples of media data for the client for the immersive media experience. A derivation operation is performed to generate a portion of media data for a derived media track, including processing the plurality of media tracks to generate a first series of samples of the media data for the immersive media experience, and outputting the derived media track.

20 Claims, 9 Drawing Sheets

(56) References Cited

U.S. PATENT DOCUMENTS

| | | | |
|---|---|---|---|
| 2018/0199044 A1* | 7/2018 | Wang | H04N 19/1883 |
| 2019/0158933 A1* | 5/2019 | Ouedraogo | H04N 21/816 |
| 2020/0275156 A1* | 8/2020 | He | H04N 21/4126 |
| 2020/0389676 A1* | 12/2020 | Denoual | H04N 21/2353 |

OTHER PUBLICATIONS

[No Author Listed], Information technology—MPEG systems technologies—Part 16: Derived visual tracks in the ISO base media file format. International Standard, ISO/IEC 23001-16. 2020, 20 pages.

[No Author Listed], Information technology—Coded representation of immersive media—Part 2: Omnidirectional MediA Format (OMAF) 2nd Edition, Potential Improvement of OMAF. International Standard, ISO 23090-2. N19435. Jul. 2020. 326 pages.

[No Author Listed], Information technology—Coded representation of immersive media—Part 10: Carriage of Visual Volumetric Video-based Coding Data. International Standard, ISO/IEC 23090-10. 2020. 58 pages.

[No Author Listed], Information technology—Coded representation of immersive media—Part 14: Scene Description for MPEG Media, WD on Scene Description for MPEG Media. International Standard, ISO/IEC 23090-14. Jul. 2020. 16 pages.

Bouazizi et al., Requirements on Integration of Scene Description in MPEG-I. International Organisation for Standardisation, Coding of Moving Pictures and Audio, ISO/IEC JTC1/SC29/WG11 N18339. Mar. 2019:15 pages.

Kondrad et al., Technologies under Considerations on Scene Description for MPEG Media. International Organisation for Standardisation, Coding of Moving Pictures and Audio, ISO/IEC JTC1/SC29/WG11 MPEG2020/N19290. Apr. 2020:19 pages.

Mazé, Technologies under Consideration on ISO/IEC 23001-16. International Organisation for Standardisation, Coding of Moving Pictures and Audio, ISO/IEC JTC1/SC29/WG11 N19450. Jul. 2020:17 pages.

Wang et al., Track Derivations for Track Selection and Switching in ISOBMFF. International Organisation for Standardisation, Coding of Moving Pictures and Audio, ISO/IEC JTC1/SC29/WG11/ MPEG2020/M54876. Oct. 2020:11 pages.

\* cited by examiner

METHODS AND SYSTEMS FOR IMPLEMENTING SCENE DESCRIPTIONS USING DERIVED VISUAL TRACKS

RELATED APPLICATIONS

This Application claims priority under 35 U.S.C. § 119(e) to U.S. Provisional Application No. 63/087,943, filed Oct. 6, 2020, and entitled "METHOD AND SYSTEM FOR IMPLEMENTING MPEG-I SCENE DESCRIPTION USING DERIVED VISUAL TRACKS IN ISOBMFF," which is hereby incorporated by reference herein in its entirety.

TECHNICAL FIELD

The techniques described herein relate generally to implementing scene descriptions using derived visual tracks, including implementing MPEG-I scene descriptions using derived visual tracks in the ISO Base Media File Format (ISOBMFF).

BACKGROUND OF INVENTION

Various types of 3D content, immersive content, and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangular projection can be used to put the spherical map into a two-dimensional image. This can be then further processed, for example, using two-dimensional encoding and compression techniques. Ultimately, the encoded and compressed content is stored and delivered using a desired delivery mechanism (e.g., thumb drive, digital video disk (DVD), file download, digital broadcast, and/or online streaming). Such video can be used for virtual reality (VR) and/or 3D video.

At the client side, when the client processes the content, a video decoder decodes the encoded and compressed video and performs a reverse-projection to put the content back onto the sphere. A user can then view the rendered content, such as using a head-mounted viewing device. The content is often rendered according to a user's viewport, which represents an angle at which the user is looking at the content. The viewport may also include a component that represents the viewing area, which can describe how large, and in what shape, the area is that is being viewed by the viewer at the particular angle.

SUMMARY OF INVENTION

In accordance with the disclosed subject matter, apparatus, systems, and methods are provided for implementing scene descriptions for immersive media applications. The scene descriptions, such as MPEG-I scene descriptions, can be implemented using derived tracks. Using derived tracks can, for example, provide for transitioning some of the scene processing to the server-side rather than the client side (e.g., for streaming use cases). In some embodiments, the derived tracks are ISO Base Media File Format (ISOBMFF) derived tracks.

Some embodiments relate to a method implemented by a server in communication with a client device, the method including receiving, from the client device, a set of one or more parameters associated with the client device; accessing multimedia data for an immersive media experience, comprising: a plurality of media tracks, each media track comprising an associated series of samples of media data for a different component of the immersive media experience; and a derived track comprising a set of derivation operations to perform to generate a series of samples of media data for the client for the immersive media experience; performing a derivation operation of the set of derivation operations to generate a portion of media data for a media track, comprising: processing the plurality of media tracks to generate a first series of samples of the media data for the immersive media experience; and transmitting the media track comprising the portion of the media data to the client device.

In some examples, the plurality of media tracks comprises a plurality of 3D visual tracks.

In some examples, the plurality of media tracks comprises a plurality of 2D and 3D visual tracks.

In some examples, the set of derivation operations to generate a series of samples of media data for the client for the immersive media experience based on a scene description.

In some examples, the immersive media experience comprises a scene comprising a 360 degree image and wherein the plurality of media tracks comprise one or more visual and audio tracks.

In some examples, the immersive media experience comprises 3D audio and a scene comprising a 360 degree image and wherein the plurality of media tracks comprises a track for the 3D audio and a track for the 360 degree image within a file.

In some examples, the immersive media experience comprises subtitles and a scene comprising a 360 degree image.

In some examples, the plurality of media tracks comprises a track for the 360 degree image and a track for the subtitles, and wherein the set of derivation operations comprises operations to perform a composition transformation for rendering the subtitle track over the 360 degree image.

In some examples, the immersive media experience comprises a scene and an object added into the scene.

In some examples, the plurality of media tracks comprises a track for the scene and a track for the object, and wherein the set of derivation operations comprises operations to perform an overlay transformation for adding the object into the scene.

In some examples, the immersive media experience comprises a 3D scene displaying a 2D video on a 3D area of the 3D scene.

In some examples, the plurality of media tracks comprises a track for the 3D scene and a track for the 2D video, and wherein the set of derivation operations comprises operations to perform an overlay transformation for placing the 2D video on the 3D area.

Some embodiments relate to an apparatus comprising a processor in communication with a memory, the processor being configured to execute instructions stored in the memory that cause the processor to perform accessing a set of one or more parameters for processing a scene description for an immersive media experience; accessing multimedia data for the immersive media experience, comprising: a plurality of media tracks, each media track comprising an associated series of samples of media data for a different component of the immersive media experience; and a derived track comprising a set of derivation operations to perform to generate a series of samples of media data for the client for the immersive media experience; performing a derivation operation of the set of derivation operations to generate a portion of media data for an media track, comprising: processing the plurality of media tracks to generate a first series of samples of the media data for the immersive media experience; and outputting the media track comprising the portion of the media data to the client device.

In some examples, the plurality of media tracks comprises a plurality of 3D visual tracks.

In some examples, the plurality of media tracks comprises a plurality of 2D and 3D visual tracks.

In some examples, the set of derivation operations to generate a series of samples of media data for the client for the immersive media experience based on a scene description.

In some examples, the immersive media experience comprises a scene comprising a 360 degree image and wherein the plurality of media tracks comprise one or more visual and audio tracks.

In some examples, the immersive media experience comprises 3D audio and a scene comprising a 360 degree image and wherein the plurality of media tracks comprises a track for the 3D audio and a track for the 360 degree image within a file.

In some examples, the immersive media experience comprises subtitles and a scene comprising a 360 degree image.

In some examples, the plurality of media tracks comprises a track for the 360 degree image and a track for the subtitles, and wherein the set of derivation operations comprises operations to perform a composition transformation for rendering the subtitle track over the 360 degree image.

In some examples, the immersive media experience comprises a scene and an object added into the scene.

In some examples, the plurality of media tracks comprises a track for the scene and a track for the object, and wherein the set of derivation operations comprises operations to perform an overlay transformation for adding the object into the scene.

In some examples, the immersive media experience comprises a 3D scene displaying a 2D video on a 3D area of the 3D scene.

In some examples, the plurality of media tracks comprises a track for the 3D scene and a track for the 2D video, and wherein the set of derivation operations comprises operations to perform an overlay transformation for placing the 2D video on the 3D area.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION OF INVENTION

Figure 1:
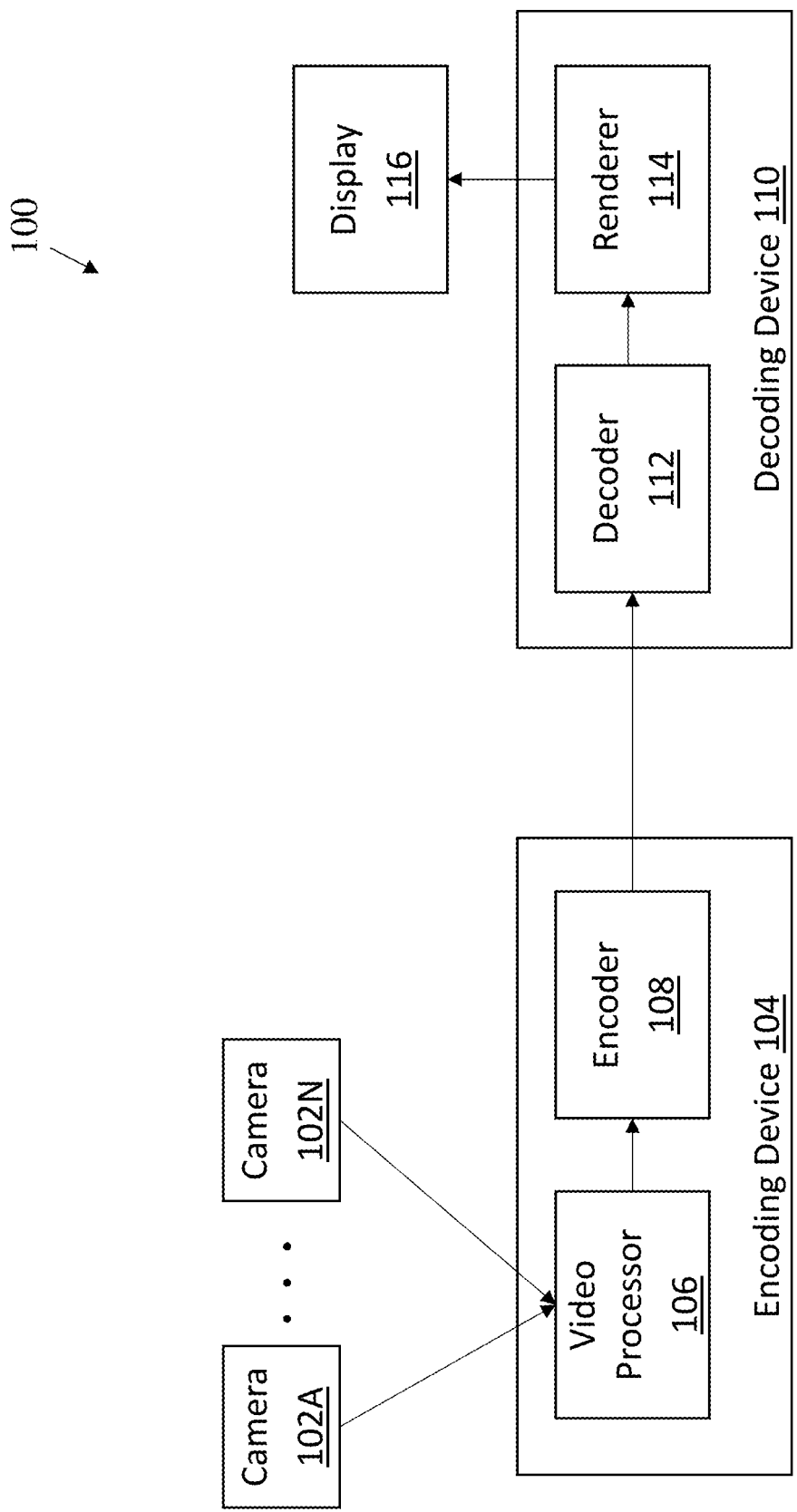
FIG. 1 shows an exemplary video coding configuration, according to some embodiments.

The inventors have appreciated that it is desirable to provide technology to implement various immersive media scenes and experiences. However, conventional approaches proposed to implement immersive media scenes typically require a number of separate processing pipelines that are performed by the client device. Each pipeline can require performing one or more processing steps, such as streaming, demultiplexing, decoding, decryption, and/or format conversion. Conventional approaches also require a presentation engine to access and process the resulting data generated by each pipeline in order to process the content from across the various pipelines in order to render the ultimate immersive media scene to a viewer. In some examples, the processing steps performed by the presentation engine may further include converting formats of the buffered data, creating new static or dynamic buffers (e.g., index buffers based on metadata received from the file itself), and/or the like.

The inventors have discovered and appreciated deficiencies with such approaches. In particular, each pipeline requires the client to implement an associated decoder, perform the processing associated with the pipeline, and to buffer the resulting data. Further, the scene can only be implemented by the presentation engine after the pipelines process the data. Accordingly, current approaches place a heavy burden on the client, since the client is responsible for both implementing the various required pipelines as well as the presentation engine. Accordingly, the client device must have sufficient minimum-processing capabilities. Such client-side burdens can be further compounded based on certain types of content. For example, some content (e.g., immersive media content) requires the client to perform various compute-intensive processing steps in order to decode the content for the scene.

According to some aspects of the present invention, the techniques provide a file format-based approach that uses derived visual tracks to implement immersive media scenes. According to some embodiments, derived tracks may include derived visual tracks whose samples specify derivation transformations that can be used to generate, using input tracks or images, an output visual track with visual samples of the immersive media scene (or parts of the immersive media scene). In some embodiments, a derived track can specify the derivation operations on media content (e.g., 2D and/or 3D content) contained in input tracks to render a portion of an immersive media scene. For example, a derived visual track may specify a composition transformation to perform on input visual tracks, which generates a composed visual track representing an immersive media experience using the associated input visual tracks as specified in a scene description. As another example, a derived visual track may specify an overlay transformation to perform on two input visual tracks, and the track derivation operation may generate an overlaid visual track using the two input tracks.

As a result, the derived track approach described herein provides for performing composition and overlay derivation operations on associated input tracks using derived tracks used to implement various immersive media usage scenarios. In some embodiments, such approaches can use a scene description to enable mapping high-level scene descriptions (e.g., which content is composed, how, etc.) onto low-level media tracks that include the media content, which can provide flexibility for scene-related content storage, delivery and processing. In contrast to conventional approaches, when using one or more derived visual tracks, one or more scene tasks can be performed by their respective decoders, rather than by the presentation engine. For example, conventional approaches implement an overlay using the presentation engine after completing associated pipelines to place the object and background content into their respective buffers that are accessed by the presentation engine. According to the techniques described herein, the overlay can be implemented by a derived track to overlay the object at a track level. The overlay can be performed, for example, by the decoder of the derived track and/or earlier in the processing flow, such as by the media access function (MAF) when the derived track is accessed and prior to transmission to the client device. Accordingly, using such a derived track approach, it is possible to move the overlay operation onto the server side (e.g., to deliver the overlaid scene as a single media track to the client), rather than performing the overlay operation on the client side (e.g., requiring the client to request two separate tracks for the object and background content, and to perform the overlay accordingly).

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a hand-held device, a portion of a head-mounted display, or any other apparatus with decoding capability. The decoding device 110 includes a decoder 112 that is configured to decode the encoded video. The decoding device 110 also includes a renderer 114 for rendering the two-dimensional content back to a format for playback. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
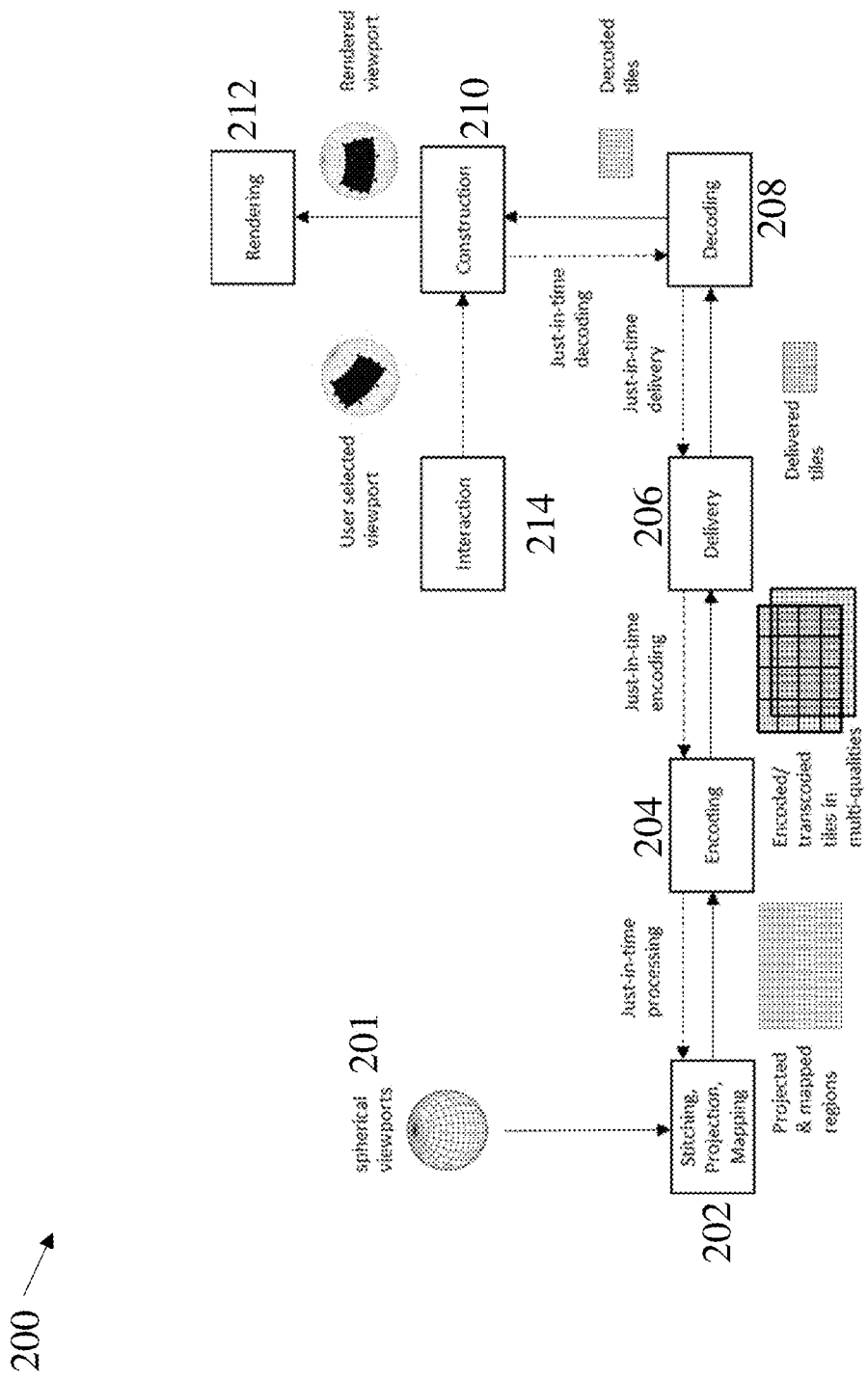
FIG. 2 shows a viewport dependent content flow process for virtual reality (VR) content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

Figure 3:
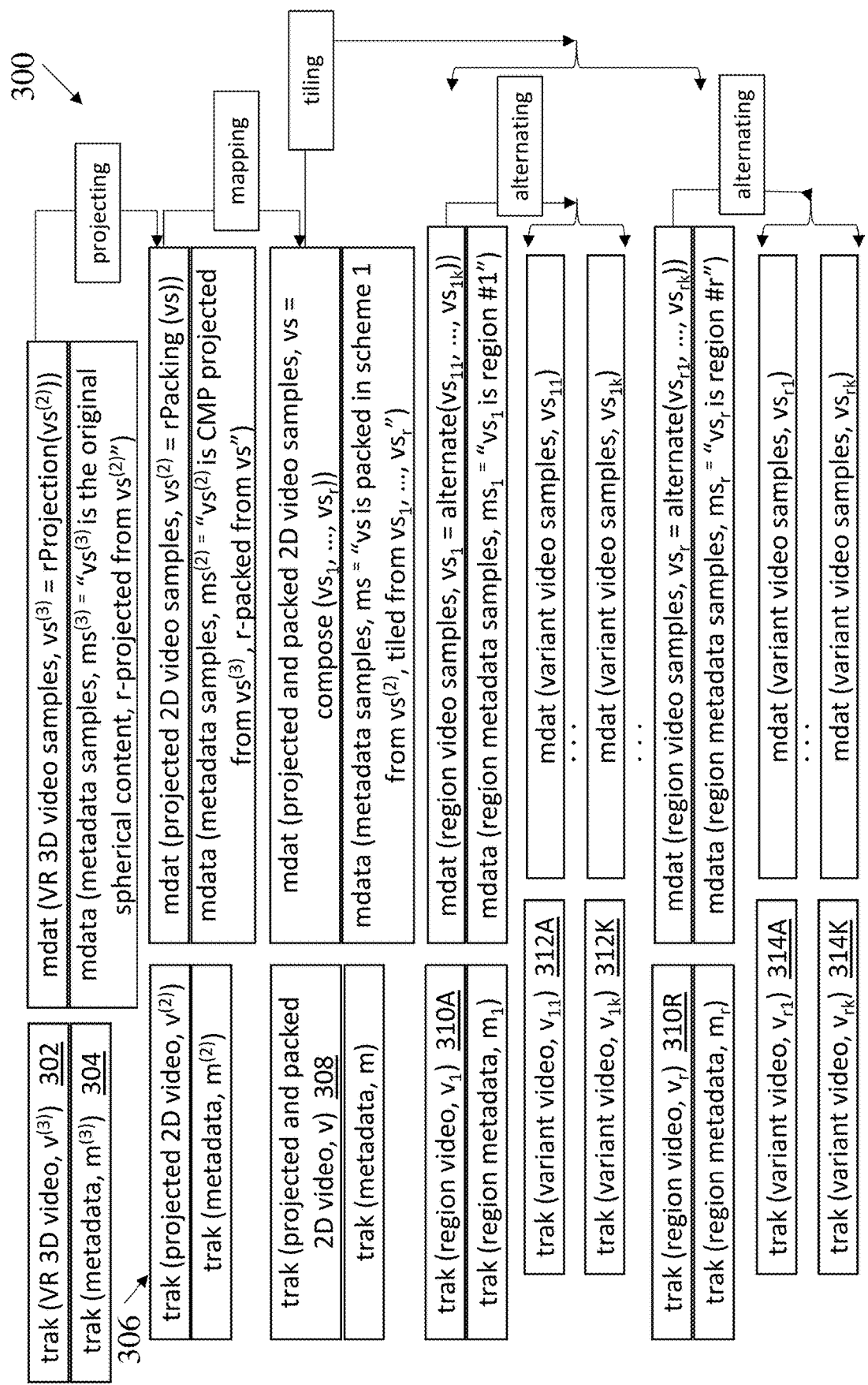
FIG. 3 shows an exemplary track hierarchical structure, according to some embodiments.

A flat file structure for the content could be used, for example, for a video track for a single movie. For VR content, there is more content than is sent and/or displayed by the receiving device. For example, as discussed herein, there can be content for the entire 3D sphere, where the user is only viewing a small portion. In order to encode, store, process, and/or deliver such content more efficiently, the content can be divided into different tracks. FIG. 3 shows an exemplary track hierarchical structure 300, according to some embodiments. The top track 302 is the 3D VR spherical content track, and below the top track 302 is the associated metadata track 304 (each track has associated metadata). The track 306 is the 2D projected track. The track 308 is the 2D big picture track. The region tracks are shown as tracks 310A through 310R, generally referred to as sub-picture tracks 310. Each region track 310 has a set of associated variant tracks. Region track 310A includes variant tracks 312A through 312K. Region track 310R includes variant tracks 314A through 314K. Thus, as shown by the track hierarchy structure 300, a structure can be developed that starts with physical multiple variant region tracks 312, and the track hierarchy can be established for region tracks 310 (sub-picture or tile tracks), projected and packed 2D tracks 308, projected 2D tracks 306, and VR 3D video tracks 302, with appropriate metadata tracks associated them.

In operation, the variant tracks include the actual picture data. The device selects among the alternating variant tracks to pick the one that is representative of the sub-picture region (or sub-picture track) 310. The sub-picture tracks 310 are tiled and composed together into the 2D big picture track 308. Then ultimately the track 308 is reverse-mapped, e.g., to rearrange some of the portions to generate track 306. The track 306 is then reverse-projected back to the 3D track 302, which is the original 3D picture.

The exemplary track hierarchical structure can include aspects described in, for example: m39971, "Deriving Composite Tracks in ISOBMFF", January 2017 (Geneva, CH); m40384, "Deriving Composite Tracks in ISOBMFF using track grouping mechanisms", April 2017 (Hobart, AU); m40385, "Deriving VR Projection and Mapping related Tracks in ISOBMFF;" m40412, "Deriving VR ROI and Viewport related Tracks in ISOBMFF", MPEG 118$^{th}$ meeting, April 2017, which are hereby incorporated by reference herein in their entirety. In FIG. 3, rProjection, rPacking, compose and alternate represent the track derivation TransformProperty items reverse 'proj', reverse 'pack', 'cmpa' and 'cmp1', respectively, for illustrative purposes and are not intended to be limiting. The metadata shown in the metadata tracks are similarly for illustrative purposes and are not intended to be limiting. For example, metadata boxes from OMAF can be used as described in w17235, "Text of ISO/IEC FDIS 23090-2 Omnidirectional Media Format," 120th MPEG Meeting, October 2017 (Macau, China), which is hereby incorporated by reference herein in its entirety.

The number of tracks shown in FIG. 3 is intended to be illustrative and not limiting. For example, in cases where some intermediate derived tracks are not necessarily needed in the hierarchy as shown in FIG. 3, the related derivation steps can be composed into one (e.g., where the reverse packing and reverse projection are composed together to eliminate the existence of the projected track 306).

A derived visual track can be indicated by its containing sample entry of type 'dtrk'. A derived sample contains an ordered list of the operations to be performed on an ordered list of input images or samples. Each of the operations can be specified or indicated by a Transform Property. A derived visual sample is reconstructed by performing the specified operations in sequence. Examples of transform properties in ISOBMFF that can be used to specify a track derivation, including those in the latest ISOBMFF Technologies Under Consideration (TuC) (see, e.g., N17833, "Technologies under Consideration for ISOBMFF", July 2018, Ljubljana, SK, which is hereby incorporated by reference herein in its entirety), include: the 'idtt' (identity) transform property; the 'clap' (clean aperture) transform property; the 'srot' (rotation) transform property; the 'dslv' (dissolve) transform property; the '2dcc' (ROI crop) transform property; the 'tocp' (Track Overlay Composition) transform property; the 'tgcp' (Track Grid Composition) transform property; the 'tgmc' (Track Grid Composition using Matrix values) transform property; the 'tgsc' (Track Grid Sub-Picture Composition) transform property; the 'tmcp' (Transform Matrix Composition) transform property; the 'tgcp' (Track Grouping Composition) transform property; and the 'tmcp' (Track Grouping Composition using Matrix Values) transform property. All of these track derivations are related to spatial processing, including image manipulation and spatial composition of input tracks.

Derived visual tracks can be used to specify a timed sequence of visual transformation operations that are to be applied to the input track(s) of the derivation operation. The input tracks can include, for example, tracks with still images and/or samples of timed sequences of images. In some embodiments, derived visual tracks can incorporate aspects provided in ISOBMFF, which is specified in w18855, "Text of ISO/IEC 14496-12 6$^{th}$ edition," October 2019, Geneva, CH, which is hereby incorporated by reference herein in its entirety. ISOBMFF can be used to provide, for example, a base media file design and a set of transformation operations. Exemplary transformation operations include, for example, Identity, Dissolve, Crop, Rotate, Mirror, Scaling, Region-of-interest, and Track Grid, as specified in w19428, "Revised text of ISO/IEC CD 23001-16 Derived visual tracks in the ISO base media file format," July 2020, Online, which is hereby incorporated by reference herein in its entirety. Some additional derivation transformation candidates are provided in the TuC w19450, "Technologies under Consideration on ISO/IEC 23001-16," July, 2020, Online, which is hereby incorporated by reference herein in its entirety, including composition and immersive media processing related transformation operations.

Figure 4:
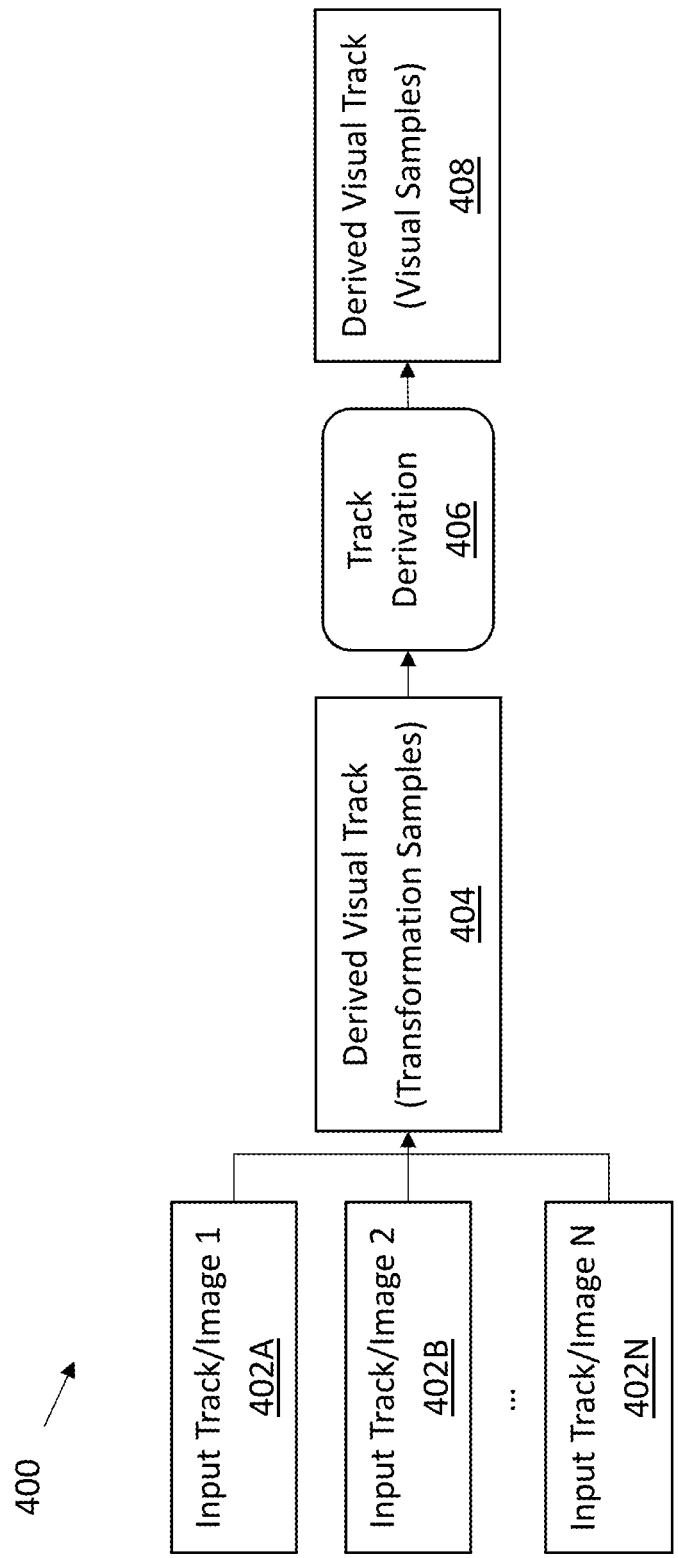
FIG. 4 shows an example of a track derivation operation, according to some examples.

FIG. 4 shows an example of a track derivation operation 400, according to some examples. A number of input tracks/images one (1) 402A, two (2) 402B through N 402N are input to a derived visual track 404, which carries transformation operations for the transformation samples. The track derivation operation 406 applies the transformation operations to the transformation samples of the derived visual track 404 to generate a derived visual track 408 that includes visual samples.

Figure 5:
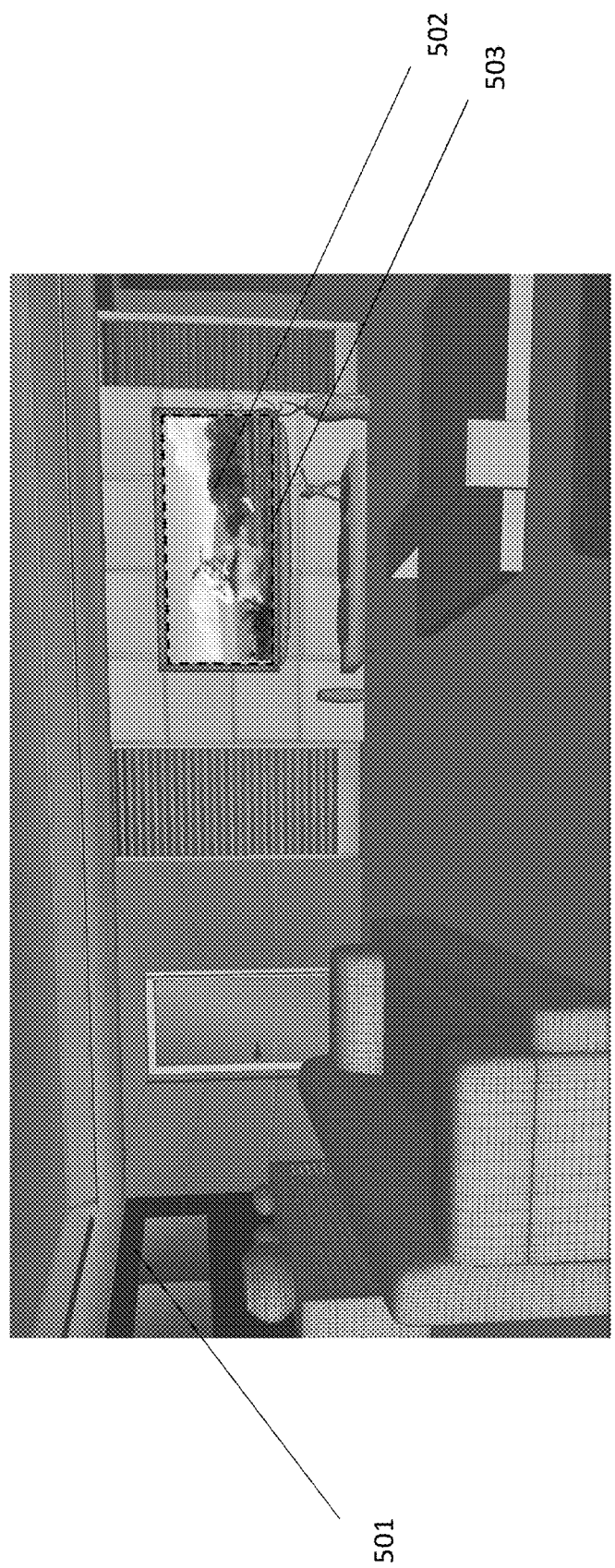
FIG. 5 shows an exemplary 3D scene including a 2D Video, according to some examples.

Two track selection-based derivation transformations, namely "Selection of One" ('sel1') and "Selection of Any" ('seln'), were proposed in m39971, "Deriving Composite Tracks in ISOBMFF," January 2017, Geneva, CH, which is hereby incorporated by reference herein in its entirety. However, both of these transformations were designed for the purpose of image composition of input tracks, and therefore require dimensional information for the composition operation. For example, FIG. 5 shows an exemplary syntax for a selection of only one ('sel1') transformation property 500, according to some examples. The sel1 transformation property 500 includes reference_width 502 and reference_height 504 fields which give, respectively, the width and height of the reference rectangular space in which all coordinates (top_left_x 506, top_left_y 508, width 510 and height 512) are computed. These fields specify the size of the derived image that is composed of all input images of their corresponding input visual tracks. The fields top_left_x 506 and top_left_y 508 specify, respectively, the horizontal and vertical coordinate of the top-left corner of the rectangle region that the input media image of the corresponding track is to be placed. The fields width 510 and height 512 specify, respectively, the width and height of the rectangular region that the input media image of the corresponding track is to be placed. The sel1 transformation property can specify a reference width and height of a derived sample (reference_width 502 and reference_height 504, respectively) and place or compose one (e.g., and only one) input image from a same track selected throughout the transformation onto the derived sample at its corresponding location specified by top_left_x 506 and top_left_y 508 and with its corresponding size width 510 and height 512.

According to some embodiments, a scene description (e.g., an MPEG-I Scene Description) may provide a format for providing a description of an immersive media experience. A scene description can, for example, provide a format based on immersive content, such as 3DoF and 6DoF content. The format can be used with one or more technologies, such as Augmented Reality (AR), Virtual Reality (VR), and/or Mixed Reality (MR) technologies. The Scene Description may store 3D data such as, for example, synthetic 3D data (e.g., created by a computer) and/or natural 3D data (e.g., captured from the real world using cameras). The scene description can also include other data, such as 2D data, audio data, etc. In some examples, the scene description may expose interfaces between components of the format and/or enable 3D interactive experiences. For example, in addition to describing scenes, a scene description can include interfaces between components in scenes (e.g., of various 2D and/or 3D content source(s) associated with the scene).

According to some embodiments, the scene description may be input into and used by a presentation engine that uses the scene description to render a scene (e.g., 3D scene) to a viewer. The extensions provided in the specification of the scene description may allow for the creation of immersive experiences using immersive media, such as MPEG media.

Scene descriptions can leverage various structures to describe the scene. According to some embodiments, a scene graph is a type of a scene description, where, for example, a scene is described using a graph structure. A scene graph may be used to describe scenes including different types of video, images, audio, and/or the like and may be implemented by providing extensions to scene description formats in order to support immersive media. Examples of supporting MPEG media are described in "The GL Transmission Format (glTF) 2.0", N19290, "WD on Scene Description for MPEG Media", July 2020, Online, which are hereby incorporated by reference herein in their entirety. In other embodiments other scene descriptions may be used, such as scene descriptions that include relations using object lists.

As an illustrative example, the MPEG-I Scene Descriptions, whether implemented as scene graphs and/or other formats, may be used in different reference usage scenarios as described in N18339, "Requirements on Integration of Scene Description in MPEG-I," March 2019, Geneva, CH, which is hereby incorporated by reference herein in its entirety. These reference usage scenarios provide for high-level concepts that need to be implemented. A first example of a reference usage scenario is one that uses 360 degree image and/or video. For example, it can be desirable to provide for a scene description that describes a scene that includes a 360 degree image. The content for the scene can be obtained from various sources. According to some embodiments, the image can be referenced locally. According to some embodiments, the image may be referenced through a network.

Variations of this first exemplary scenario are possible. For example, the images and/or video can be streamed over the network (e.g. using Dynamic Adaptive Streaming over HTTP (DASH)). In some examples, the geometry of the image or video is based on a spherical geometry, but is not limited as such and may be provided in formats different than a sphere (e.g. as a cube). According to some examples, the video is in stereoscopic format. In some examples, the referenced content is a 360 degree video formatted as an Omnidirectional Media Format (OMAF) file. In some examples, the video is included in an OMAF file as one or multiple tracks, and the OMAF file may also contain an audio track.

A second example of a reference usage scenario is for 3D audio and 360 degree video. For example, it can be desirable for a scene description to describe a scene that consists of a 360 degree image and 3D audio. In some embodiments, the 360 degree image and 3D audio are both contained in one local file. In some examples, the audio may be stereo audio. In some examples, the audio is 3D audio. In some examples, the audio contains 3D audio and a non-diegetic content.

A third example of a reference usage scenario is for 360 degree video and subtitles. According to some embodiments, it can be desirable for the scene description to describe a scene that consists of a 360 degree image and a subtitle track. The rendering of the subtitle track may be controlled by the scene description.

A fourth example of a reference usage scenario is for combination with local objects. According to some embodiments, it can be desirable for the scene description to combine a scene (e.g., as discussed in one of the previous three exemplary reference usage scenarios) with local objects. For example, additionally or alternatively to the embodiments described herein, a local object may be present with the Scene Description. For example, an image is placed as an overlay to the scene and/or a local audio source may be added to the scene.

A fifth example of a reference usage scenario is a 3D scene with 2D video. According to some embodiments, the scene description can be used to compose the 3D and 2D scene and to display the 2D video on the 3D area. The 2D video can be referenced locally or through the network. FIG. 5 shows an exemplary 3D scene 501 including a 2D video 502, according to some examples. In FIG. 5, the exemplary 3D scene 501 of a living room may include one or more 2D areas, such as screen 503 of 3D flat screen. The 2D video 502 may be displayed on the one or more 2D areas.

The inventors have appreciated that it is desirable to provide technology that can be used to implement desired immersive media experiences, such as the exemplary reference usage scenarios discussed above. However, conventional approaches proposed to implement immersive media scenes typically require a number of separate processing pipelines. Conventional proposals also require a significant amount of the processing to be performed on the client side.

Figure 6:
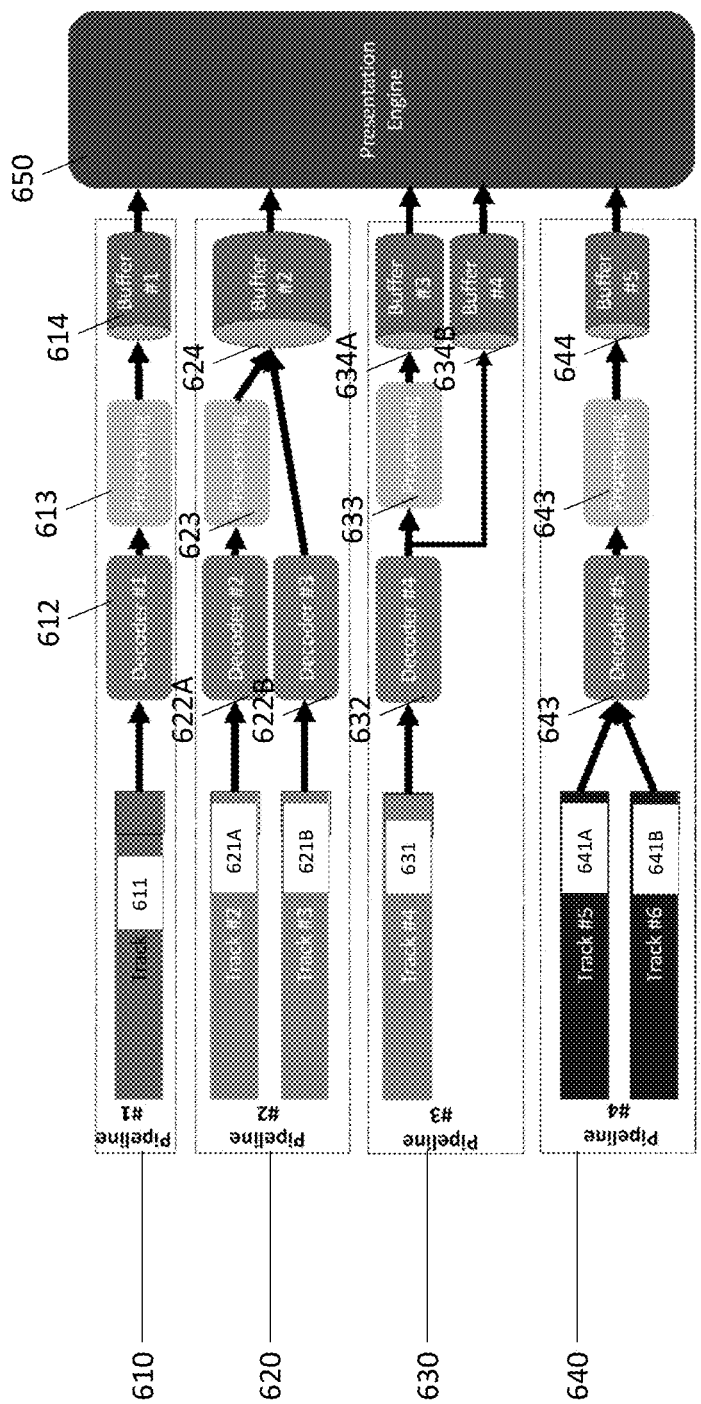
FIG. 6 shows an exemplary process for MPEG-I Scene Description media processing, according to some examples.

For example, FIG. 6 shows an exemplary process for MPEG-I Scene Description media processing, according to some examples (e.g., as described in N19290, referenced above). In the example of FIG. 6, each of the pipelines 610, 620, 630, and 640 takes in as input one or more media or metadata tracks and outputs the decoded and processed content to one or more buffers associated with each pipeline. For example, pipeline 610 takes in track 611 and outputs buffer 614, pipeline 620 takes in tracks 621A-B and outputs buffer 624, pipeline 630 takes in track 631 and outputs buffers 634A-B, and pipeline 640 takes in track 641A-B and outputs buffer 644.

Each pipeline can be configured to perform one or more processing steps (e.g., 613, 623, 633 and 634), including, for example, streaming, demultiplexing, decoding, decryption, and/or format conversion to match the expected buffer format. The scene description can include data that describes how to process the content from the buffers (e.g., 614, 624, 634A-B, and 644) feeding into the presentation engine 650. As described herein, the scene description may be input into and/or accessed by the presentation engine 650 to process the content from across the various buffers in order to render a scene (e.g., 3D scene) to a viewer. In some examples, the processing steps may convert formats of the buffered data, may create new static or dynamic buffers (e.g., index buffers based on metadata received from the file itself), and/or the like.

The inventors have discovered and appreciated deficiencies with conventional scene description implementation approaches. In particular, such approaches require a client to implement a number of processing pipelines in order to implement the scene description. Each pipeline requires the client to implement an associated decoder, perform the processing associated with the pipeline, and to buffer the resulting data. Further, the scene described in the scene description can only be implemented after the pipelines process the data (e.g., as shown in FIG. 6). Accordingly, current approaches place the burden of the scene creation on the client, such that the client is responsible for both implementing the various required pipelines, and also implementing the presentation engine to create the scene for client consumption. Accordingly, a heavy burden is placed on the client, and it requires the client device to have sufficient minimum-processing capabilities. Such client-side burdens can be further compounded based on certain types of content. For example, some content (e.g., immersive media content) requires the client to perform various compute-intensive processing steps in order to decode the content for the scene.

According to some aspects of the present invention, the techniques provide a file format-based approach that uses derived visual tracks to implement immersive media scenes. For example, composition and overlay derivation operations can be performed on associated input tracks to generate derived tracks that can be used to implement immersive media usage scenarios, such as, for example, those described herein. Such approaches can enable mapping high-level scene descriptions onto low-level media tracks that include the media content, which can provide flexibility for scene-related content storage, delivery and processing.

As described herein, derived visual tracks may enable defining a timed sequence of visual transformation operations to be applied to input still images and/or samples of timed sequences of images. For example, supported transformations may include identity, composition, rotation, scaling and grid composition operations. In some embodiments, the supported transformations may include static and dynamic overlays, as well as some immersive media processing related transformations such as stitching, projection, packing and viewport transformations. In some embodiments, the derived visual tracks may be built using tools provided in the ISO base media file format (ISO/IEC 14496-12), such as those specified in w19428, "ISO/IEC 23001-16 Revised CD, Derived Visual Tracks in ISOBMFF," July 2020 (Online), which are hereby incorporated by reference herein in its entirety, and/or the latest description of the TuC w19450, reference above.

Therefore, a server can use a derived track that includes composition or transformation derivation operations that allow the server and/or pipeline to construct a single media track for the user based on the underlying media tracks. As described herein, a number of input tracks (e.g., tracks with different media content, audio content, subtitles, etc.) can be processed by track derivation operations to compose the input tracks at the sample level to generate the media samples of the media track. Accordingly, the track derivation techniques described herein allow for the creation of some and/or all of an immersive media scene at the time of the derivation operation. In some embodiments, the track derivation can provide for a track encapsulation of track samples as the output from the derivation operation(s) of a derived track, where the track samples are composed based on a set of input content tracks.

According to some embodiments, derived tracks may include derived visual tracks whose samples specify derivation transformations that can be used to generate, from input tracks or images, an output visual track with visual samples of the scene. For example, a derived track can specify the derivation operations on 3D and 2D content contained in input tracks in order to render a scene such as that shown in FIG. 5. For example, a derived visual track may specify a composition transformation to perform in input visual tracks, and the track derivation may be performed to generate a composed visual track representing an immersive media experience using the associated input visual tracks as specified in the scene description. As another example, a derived visual track may specify an overlay transformation to perform on two input visual tracks, and the track derivation operation may generate an overlaid visual track using the two input tracks.

In contrast to conventional approaches, when one or more tracks are derived visual tracks, one or more scene tasks, such as composition and overlay tasks, can be performed by their respective decoders, rather than by the presentation engine using the buffers feeding into the presentation engine. For example, for an overlay operation, conventional approaches describe the overlay as part of a scene using the scene description, which is implemented by the presentation engine after using associated pipelines to place the object and background into their respective buffers. According to the techniques described herein, the overlay can be implemented by a derived track to overlay the object at a track level. The overlay can be performed, for example, by the decoder of the derived track and/or earlier in the processing flow, such as by the media access function (MAF) when the derived track is accessed and prior to transmission to the client device. Accordingly, using such a derived track approach, it is possible to move the overlay operation onto the server side (e.g., to deliver the overlaid scene to the client), rather than performing the overlay operation on the client side (e.g., requiring the client to request two separate tracks for the object and background, and to perform the overlay accordingly).

Figure 7:
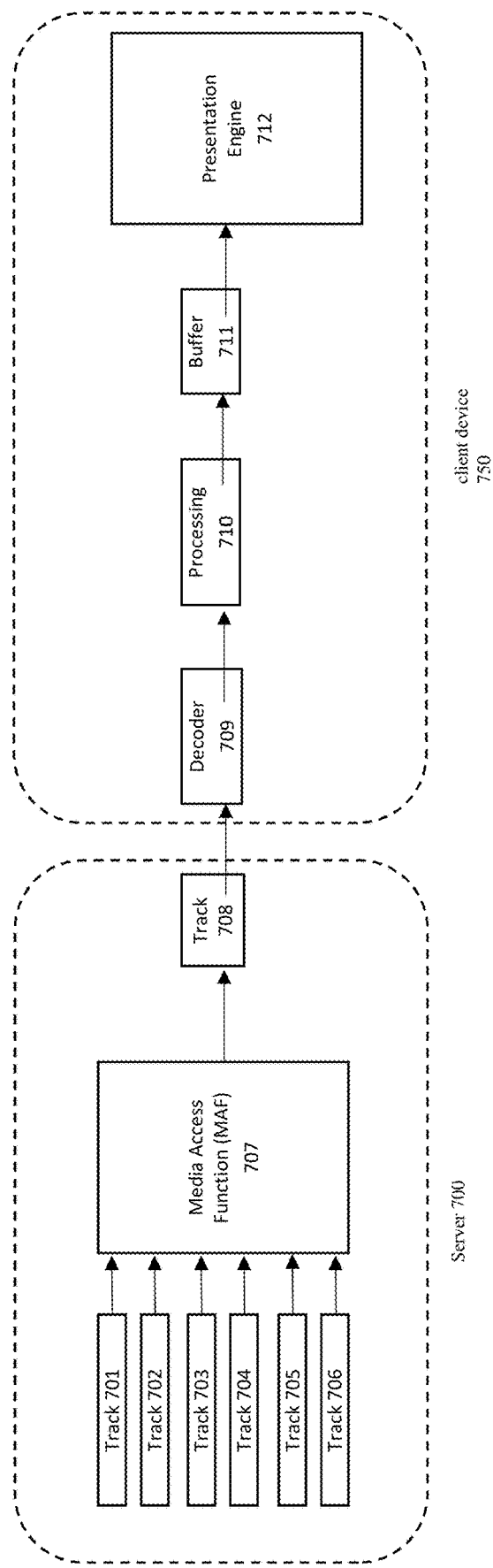
FIG. 7 shows an exemplary process for scene description media processing using derived tracks, according to some examples.

For example, FIG. 7 shows an exemplary process for scene description media processing using derived tracks, according to some examples. Using a derived track approach, the scene description can allow for various steps of the process may be performed by a server 700 and/or a client device 750 in communication with the server 700. In the example of FIG. 7, the server 700 accesses tracks 701-706, which include one or more derived tracks as well as one or more media tracks. Each of the derived tracks include metadata specifying a set of derivation operations which may be performed in the Media Access Function (MAF) 707 to generate media data for an media track. For example, the MAF may process the media track(s) to generate a series of samples of media data for a track 708. The track 708 may subsequently be transmitted to the client device 750. The client device 750 receives the track 708, performs decoding 709, processing 710, and outputs the content to the buffer 711. The presentation engine 712 then performs any remaining processing required by the scene description to create the final scene for the user's consumption. Accordingly, in some embodiments, the number of processing pipelines that need to be implemented by the client device 750 can be significantly reduced compared to conventional techniques (e.g., to just one, in this example shown in FIG. 7). Additionally, the processing required to be performed by the presentation engine 712 can also be reduced, since such processing can instead be performed by the MAF 707.

It should be appreciated that various approaches can be used to configure which aspects of the scene description are implemented by the server-side (e.g., by the MAF 707) and which aspects are implemented by the client-side (e.g., by the pipelines and/or presentation engine). For example, it may be desirable to split the processing workload in some fashion among the server 700 and client device 750. As another example, the derived track techniques can still be used in a manner that is consistent with current approaches that maintain the processing on the client side, if desired. Accordingly, the derived track approaches provide for flexibility not otherwise achievable by conventional approaches.

Figure 8:
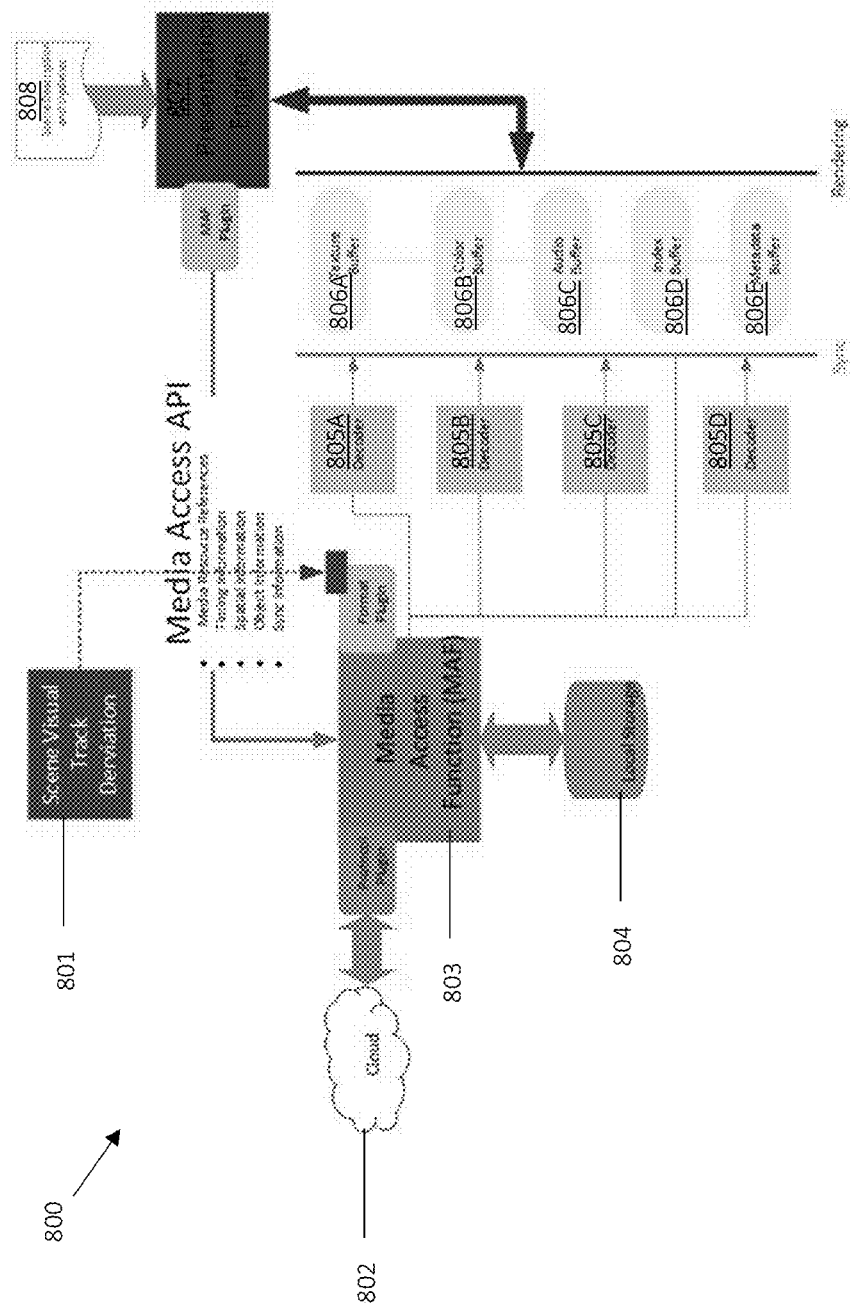
FIG. 8 shows an exemplary system for scene description media processing using derived tracks, according to some embodiments.

FIG. 8 shows an exemplary system 800 for scene description media processing using derived tracks, according to some embodiments. The exemplary system 800 is based on MPEG-I scene description media processing, although it should be appreciated that the techniques are not limited to MPEG-I scene descriptions. A server may include a Media Access Function (MAF) 803, which may access tracks from the cloud 802, or from a local source 804. According to some embodiments, the accessed tracks may include media tracks and derived tracks. The derived tracks may include a set of derivation operations which may be performed in the Media Access Function (MAF) 803 to generate media data for one or more visual tracks such as an media track, as described herein. For example, the MAF 803 may perform scene visual track derivation 801 in order to generate one or more visual tracks. The one or more visual tracks (e.g., media tracks used to build an immersive media experience) may then be transmitted to a client device in communication with the server.

The one or more visual tracks may be transmitted to decoders of the client device, shown as decoders 805A-D in FIG. 8 with associated buffers 806A-E. According to some embodiments, the performance of derivation operations by the server and transmitting the one or more visual tracks may decrease the amount of processing done by the client device in communication with the server. For example, this may reduce the number of decoding operations performed on the client side (e.g., eliminating the need for one or more of decoders 805A-D, since the associated functionality can be moved into the MAF 803) which may make it faster and less computationally expensive for the client device to create the immersive media experience.

The buffers 806A-806D may correspond to different types of data and/or aspects of the immersive experience, such as textures (e.g., texture buffer 806A), colors (e.g., color buffer 806B), audio (e.g., audio buffer 806C), indexes (e.g., index buffer 806D), and metadata (e.g., metadata buffer 806E). The buffers 806A-E and Scene Description 808 may be used by the Presentation Engine 808 of the client device to render a scene (e.g., 3D scene) to a viewer.

In some embodiments, extensions provided in the specification of the Scene Description may allow for the creation of immersive experiences using MPEG media. The Presentation Engine 807 and Media Retrieval Engine (not shown) may communicate through an interface, which allows the Presentation Engine 807 to request media data (e.g., buffers 806A-E) required for the rendering of the scene (e.g., the scene described in the reference usage scenarios, such as the one shown in FIG. 5). The Media Retrieval Engine will retrieve the requested media and make media available in a timely manner and in a format that can be immediately processed by the Presentation Engine 807. For instance, a requested media asset may be compressed and reside in the network, so the Media Retrieval Engine can retrieve and decode the asset and transmit the resulting media data to the Presentation Engine for rendering.

The media data required for constructing a scene by the presentation engine 807 according to a scene description and its updates 808 may be transmitted into their respective buffers of corresponding types, such as buffers 806A-E, from the Media Retrieval Engine. The requests for media data may be passed through the Media Retrieval API from the Presentation Engine to the Media Retrieval Engine. According to some embodiments, for flexible use of video decoding resources, the Video Decoding Engine may be used. When the Video Decoding Engine is used, the Presentation Engine may provide information for input formatting and output formatting to the Video Decoding Engine through Application Configuration Application Programming Interfaces (APIs). Application Configuration APIs can provide information about extraction and merging of the elementary stream and delivery of the decoded video sequences to appropriate buffers in rendering function in time for presentation. According to some embodiments, the Scene Description may instruct the MAF perform the operations of scene visual track derivation 801, when the tracks for carriage and delivery of the media data are derived visual tracks. It should be appreciated that while in FIG. 8 the scene description and its updates 808 are shown as provided to the presentation engine 807, the scene description and/or updates may additionally or alternatively be provided to the MAF 803.

According to other embodiments, the server may perform all of the track derivations at the MAF 803 and transmit the video track to the client device. According to some embodiments, the server may perform some, but not all track derivations at the MAF 803 to construct some portions of a scene and the client may construct some portions of a scene as well. Accordingly, while FIG. 8 shows the scene visual track derivation 801 performed by the MAF 803 in this example, one or more derivation operations may additionally or alternatively be performed by a decoder and/or the presentation engine 807. As another example, some and/or all of the functionality of the MAF 803 may be implemented locally at the client device, and therefore the client device may perform some and/or all of the MAF 803 functionality discussed herein.

As described herein, the scene descriptions (e.g., MPEG-I Scene Descriptions, such as those implemented using Scene Graphs) that leverage derived tracks may be used to achieve different reference usage scenarios. For example, for a scenario that supports 360 degree image and video, in some embodiments the scene can include a 360 degree image, and/or Visual Volumetric Video-based Coding Data (V3CD) immersive media. In some embodiments, the image or media content may be encapsulated as an Omnidirectional Media Format (OMAF) file (e.g., as described in N19435, "Potential Improvement of OMAF (2nd Edition)", July 2020, Online, which is hereby incorporated by reference herein in their entirety). In some embodiments, the image or media content may be encapsulated as a Visual Volumetric Video-based Coding Data file (V3C) (e.g., as described in N19441, "Potential Improvement for ISOIEC 23090-10 Carriage of Visual Volumetric Video-based Coding Data", July 2020, Online, which is hereby incorporated by reference herein in their entirety). The image or media content can include one or multiple visual tracks and/or audio tracks.

According to some embodiments, the derived track approach can be used to implement a usage scenario that includes 3D audio and 360 degree video. For example, for a scene that includes a 360 degree image and 3D audio, the content can be contained in one file that includes their corresponding tracks.

According to some embodiments, the derived track approach can be used to implement a usage scenario that includes 360 degree video and subtitles. For example, the scene may include a 360 degree image and a subtitle track. In this example, a derived visual track with a track corresponding to the scene and a track corresponding to the subtitle can be used to carry a composition transformation for rendering of the subtitle track over the 360 degree image. This transformation can use, for instance, the subtitle rendering structures in OMAF as described in, for example, N19435, referenced above.

According to some embodiments, the derived track approach can be used to implement a usage scenario that includes combination with local objects. According to some embodiments, a local object may be added to a scene, and a derived visual track with a track or item corresponding to the object and a track corresponding to the scene can be used to carry a composition or overlay transformation for rendering the scene, including adding the object as a composition into the scene, or placing it as an overlay to the scene. This transformation can use, for instance, the overlay transformations as described in w19450, referenced above.

According to some embodiments, the derived track approach can be used to implement a usage scenario that includes a 3D scene with 2D video. According to some embodiments, a scene displays a 2D video on a 3D area of a 3D scene (e.g., as in FIG. 5), a derived track with a track corresponding to the 3D scene and a track corresponding to the 2D video can be used to carry an overlay transformation for placing the 2D video on the specified 3D area. This transformation can use, for instance, the overlay structures in OMAF as described in, for example, N19435, referenced above.

Figure 9:
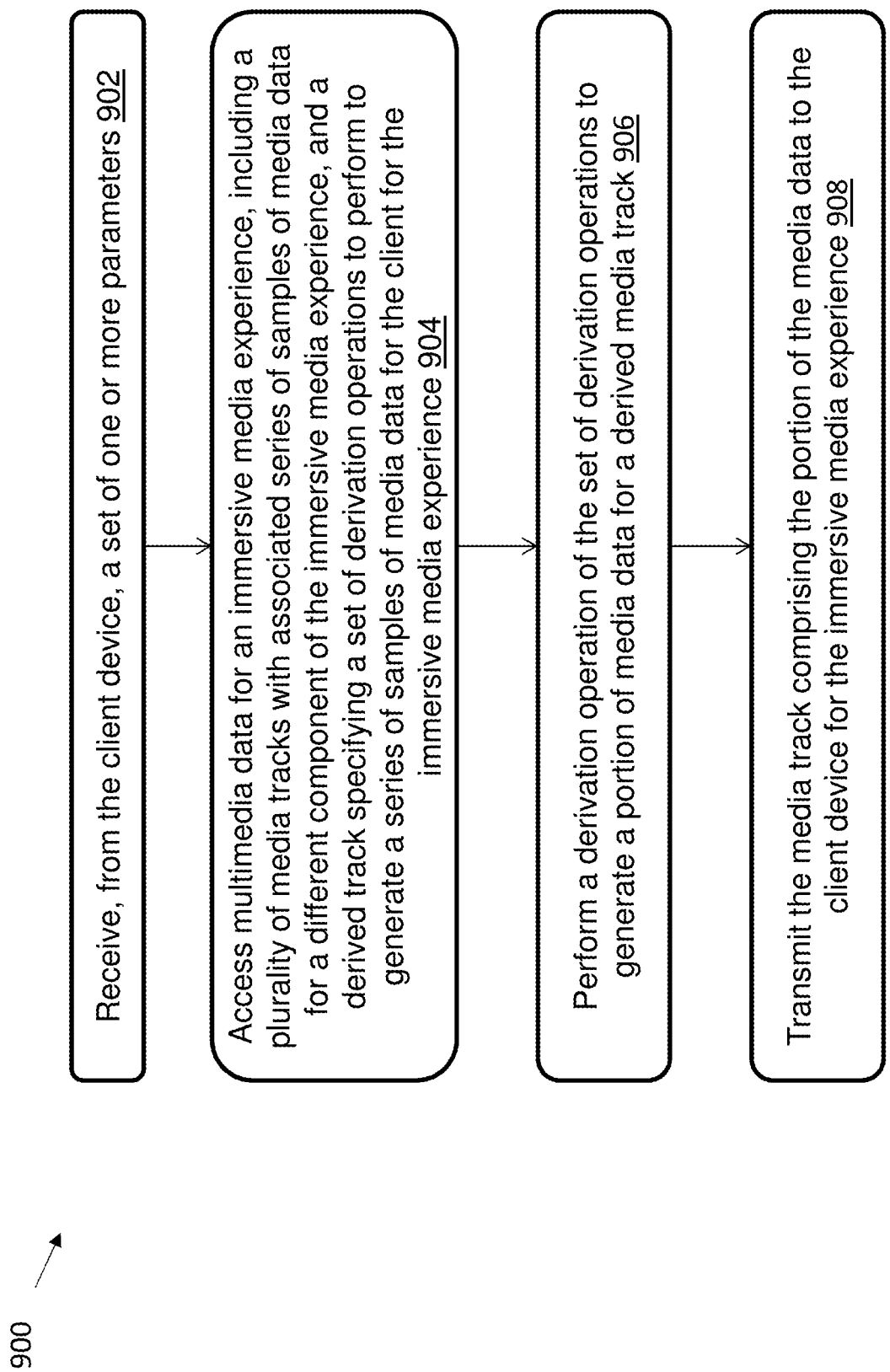
FIG. 9 shows an exemplary computerized method for a server in communication with a client device in implementing a scene description using derived tracks, according to some embodiments.

FIG. 9 shows an exemplary computerized method 900 for a server in communication with a client device for implementing a scene description using derived tracks, according to some embodiments.

At step 902, the server receives, from the client device, a set of one or more parameters. The set of one or more parameters can be related to operations provided in a scene description. For example, the one or more parameters can include the user's (2D) viewport parameters such as an x coordinate, a y coordinate, a width and/or height of the viewport. As another example, the one or more parameters may include for example, one or more offset values (e.g., horizontal_offset, vertical_offset) to indicate where the user would like to place the object onto a background.

At step 904, the server accesses multimedia data for an immersive media experience (e.g., for use with building an immersive media experience). According to some embodiments, the multimedia data may comprise a plurality of media tracks, each media track comprising an associated series of samples of media data for a different component of the immersive media experience. As also described herein, the plurality of media tracks can include a derived track comprising a set of transformation operations to perform to generate a series of samples of media data for the client for the immersive media experience. As a general matter, the server can access a derived track that includes metadata specifying one or more transformation operations to perform for the immersive media experience (e.g., based on the set of one or more parameters received at step 902). The server can also access associated input media track(s) for the derivation operations.

At step 906, the server performs a derivation operation of the set of derivation operations to generate a portion of media data for a media track, which can include an in immersive media experience track with the immersive media experience and/or a media track with media data used to build an immersive media experience (e.g., by a presentation engine). The server processes the plurality of media tracks referenced by the derived track to perform the associated transformation operation(s) to generate a series of samples of the media data for the immersive media experience. At step 908, the server transmits the media track comprising the portion of the media data to the client device.

For example, using parameters from the client device such as parameters indicating a user's (2D) viewport (e.g., x0, y0, width, height), the server may perform derivation such as ROI selection. In another example, using parameters from the client device such as where to overlay an object onto a background, (e.g., horizontal_offset, vertical_offset), the server may perform an overlay composition as the derivation.

In some embodiments, steps 902-808 can be performed by one device, such as the client device. For example, the client device can access a set of one or more parameters for processing a scene description for an immersive media experience at step 902, accessing multimedia data for the immersive media experience at step 904, perform a derivation operation at step 906, and output the derived media track comprising the portion of the media data. For example, the derived media track may be further processed to generate the immersive media experience. As another example, the derived media track may include the media data for the immersive media experience. Accordingly, the client device may render and/or display the derived media track.

According to some embodiments, the plurality of media tracks includes a plurality of 3D visual tracks. Alternatively or additionally, the plurality of media tracks includes a plurality of 2D visual tracks. According to some embodiments, the set of derivation operations to generate a series of samples of media data for the client for the immersive media experience is based on a scene description.

In some examples, the immersive media experience comprises a scene comprising a 360 degree image and the plurality of media tracks comprise one or more visual and audio tracks. According to some examples, the immersive media experience includes 3D audio and a scene comprising a 360 degree image and the plurality of media tracks includes a track for the 3D audio and a track for the 360 degree image within a file.

According to some embodiments, the immersive media experience comprises subtitles and a scene comprising a 360 degree image. In some examples, the plurality of media tracks comprises a track for the 360 degree image and a track for the subtitles, and the set of derivation operations comprises operations to perform a composition transformation for rendering the subtitle track over the 360 degree image.

According to some embodiments, the immersive media experience includes a scene and an object added into the scene. In some examples, the plurality of media tracks comprises a track for the scene and a track for the object, and the set of derivation operations includes operations to perform an overlay transformation for adding the object into the scene.

According to some embodiments, the immersive media experience includes a 3D scene displaying a 2D video on a 3D area of the 3D scene. In some examples, the plurality of media tracks includes a track for the 3D scene and a track for the 2D video, and wherein the set of derivation operations includes operations to perform an overlay transformation for placing the 2D video on the 3D area.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method implemented by a server in communication with a client device, the method comprising:
receiving, from the client device, a set of one or more parameters associated with the client device;
accessing stored multimedia data for an immersive media experience, comprising:
a track hierarchical structure comprising:
a plurality of media tracks, each media track comprising an associated series of samples of media data for a different component of the immersive media experience at least one of the media tracks at a first level of the track hierarchical structure; and a derived track at a second level different from the first level in the track hierarchical structure, the derived track comprising a set of derivation operations in accordance with at least one of the parameters associated with the client device to perform to generate a series of samples of media data for the client for the immersive media experience;

performing a derivation operation of the set of derivation operations in accordance with the at least one of the parameters associated with the client device to generate a portion of media data for a derived media track, comprising:

processing the plurality of media tracks by performing the derivation operation to generate a first series of samples of the media data for the immersive media experience; and transmitting the derived media track comprising the portion of the media data to the client device.

2. The method of claim 1, wherein the plurality of media tracks comprises a plurality of 3D visual tracks.

3. The method of claim 1, wherein the plurality of media tracks comprises a plurality of 2D and 3D visual tracks.

4. The method of claim 1, wherein the set of derivation operations to generate a series of samples of media data for the client for the immersive media experience is performed based on a scene description.

5. The method of claim 1, wherein the immersive media experience comprises a scene comprising a 360 degree image and wherein the plurality of media tracks comprise one or more visual and audio tracks.

6. The method of claim 1, wherein the immersive media experience comprises 3D audio and a scene comprising a 360 degree image and wherein the plurality of media tracks comprises a track for the 3D audio and a track for the 360 degree image within a file.

7. The method of claim 1, wherein the immersive media experience comprises subtitles and a scene comprising a 360 degree image.

8. The method of claim 7, wherein the plurality of media tracks comprises a track for the 360 degree image and a track for the subtitles, and wherein the set of derivation operations comprises operations to perform a composition transformation for rendering the subtitle track over the 360 degree image.

9. The method of claim 1, wherein the immersive media experience comprises a scene and an object added into the scene.

10. The method of claim 9, wherein the plurality of media tracks comprises a track for the scene and a track for the object, and wherein the set of derivation operations comprises operations to perform an overlay transformation for adding the object into the scene.

11. The method of claim 1, wherein the immersive media experience comprises a 3D scene displaying a 2D video on a 3D area of the 3D scene.

12. The method of claim 11, wherein the plurality of media tracks comprises a track for the 3D scene and a track for the 2D video, and wherein the set of derivation operations comprises operations to perform an overlay transformation for placing the 2D video on the 3D area.

13. An apparatus comprising a processor in communication with memory, the processor being configured to execute instructions stored in the memory that cause the processor to perform:

accessing a set of one or more parameters for processing a scene description for an immersive media experience;

accessing stored multimedia data for the immersive media experience, comprising:

a track hierarchical structure comprising:

a plurality of media tracks, each media track comprising an associated series of samples of media data for a different component of the immersive media experience at least one of the media tracks at a first level of the track hierarchical structure; and a derived track at a second level different from the first level in the track hierarchical structure, the derived track comprising a set of derivation operations in accordance with at least one of the parameters associated with the client device to perform to generate a series of samples of media data for the client for the immersive media experience;

performing a derivation operation in accordance with at least one of the parameters associated with the client device of the set of derivation operations to generate a portion of media data for a derived media track, comprising:

processing the plurality of media tracks by performing the derivation operation to generate a first series of samples of the media data for the immersive media experience; and outputting the derived media track comprising the portion of the media data.

14. The apparatus of claim 13, wherein the plurality of media tracks comprises a plurality of 3D visual tracks.

15. The apparatus of claim 13, wherein the plurality of media tracks comprises a plurality of 2D and 3D visual tracks.

16. The apparatus of claim 13, wherein the set of derivation operations to generate a series of samples of media data for the client for the immersive media experience is performed based on a scene description.

17. The apparatus of claim 13, wherein the immersive media experience comprises a scene comprising a 360 degree image and wherein the plurality of media tracks comprise one or more visual and audio tracks.

18. The apparatus of claim 13, wherein the immersive media experience comprises 3D audio and a scene comprising a 360 degree image and wherein the plurality of media tracks comprises a track for the 3D audio and a track for the 360 degree image within a file.

19. The apparatus of claim 13, wherein the immersive media experience comprises subtitles and a scene comprising a 360 degree image.

20. The apparatus of claim 19, wherein the plurality of media tracks comprises a track for the 360 degree image and a track for the subtitles, and wherein the set of derivation operations comprises operations to perform a composition transformation for rendering the subtitle track over the 360 degree image.

* * * * *